United States Patent [19]

Stocchi

[11] Patent Number: 5,603,469
[45] Date of Patent: Feb. 18, 1997

[54] ANCHORING DEVICE FOR SECURING AN END PIECE OF A CORD WOUND UP ONTO A STORAGE REEL

[75] Inventor: Vasco Stocchi, Montevarchi (AR), Italy

[73] Assignee: Pirelli Coordinamento Pneumatici S.P.A., Milan, Italy

[21] Appl. No.: 341,144

[22] Filed: Nov. 16, 1994

[30] Foreign Application Priority Data

Nov. 16, 1993 [IT] Italy ............................ MI93A02433

[51] Int. Cl.$^6$ ........................ B65H 19/29; B65H 75/28; A41F 1/00
[52] U.S. Cl. ............................................ 242/580; 24/499
[58] Field of Search .................... 242/580, 586.2, 242/586.4, 332.7, 532.5; 24/67.11, 499

[56] References Cited

U.S. PATENT DOCUMENTS

| | | | |
|---|---|---|---|
| 525,513 | 9/1894 | Pyle | 24/499 |
| 854,254 | 5/1907 | Sumerwell | 24/67.11 |
| 895,324 | 8/1908 | Albrecht | 24/67.11 |
| 1,066,335 | 7/1913 | Staples | 24/67.11 |
| 2,008,019 | 7/1935 | Horlick, Jr. | 24/67.11 |
| 2,265,393 | 12/1941 | Place | 24/564 X |
| 2,634,472 | 4/1953 | Brown | 248/73 |

FOREIGN PATENT DOCUMENTS

| | | |
|---|---|---|
| 0561063 | 9/1993 | European Pat. Off. . |
| 2518597 | 11/1975 | Germany . |
| 4021744 | 1/1992 | Germany . |
| 1457218 | 12/1976 | United Kingdom . |

*Primary Examiner*—John Q. Nguyen
*Attorney, Agent, or Firm*—Watson Cole Stevens Davis, P.L.L.C.

[57] ABSTRACT

A storage reel (2) carrying a cord (5) wound up on a core (3). The end portion (7) of the cord (5) slidably passes through a hole (6) and is fastened to the outer surface (4b) of the flange (4) by a clip (8) comprising a substantially "W" shaped elongated element (11) made of harmonic steel which is provided with terminal appendages (10) rotatably engaged to articulation seats (9a) defined in corresponding tabs (9) projecting externally of the flange (4). The elongated element (11) is bent according to consecutively opposite portions (11a) so as to form a pair of retaining loops (12) acting on a cord end portion (7) for holding it against the flange (4), as well as a counter-loop (13) acting against the flange (4) in order to generate an elastic reaction in the clip (8) thereby causing the end portion (7) to be held fast by friction under the retaining loops.

8 Claims, 1 Drawing Sheet

U.S. Patent  Feb. 18, 1997  5,603,469
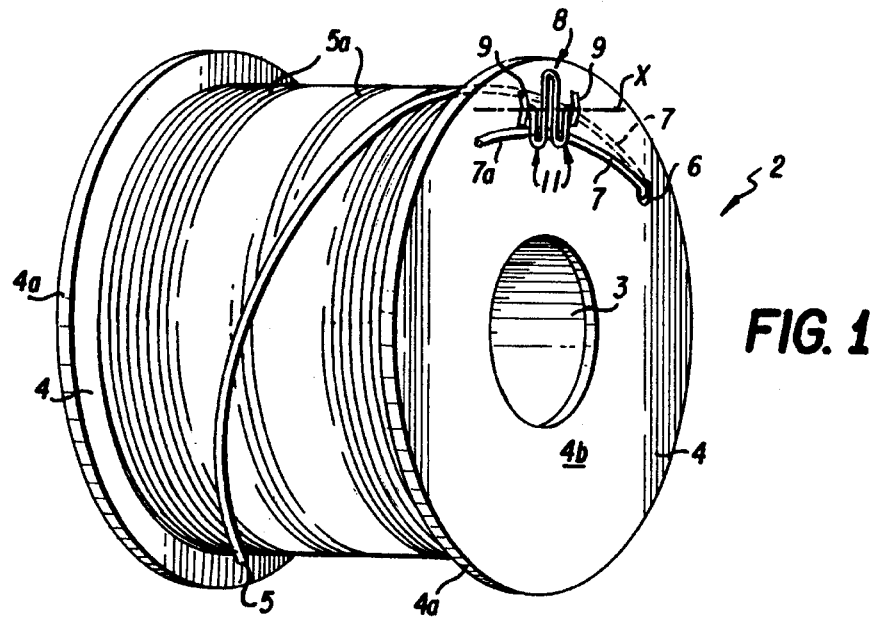
FIG. 1
FIG. 2
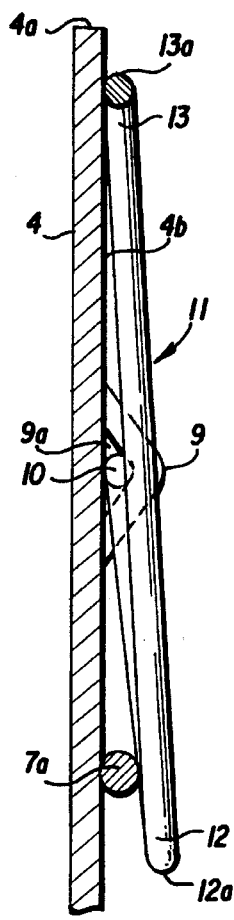
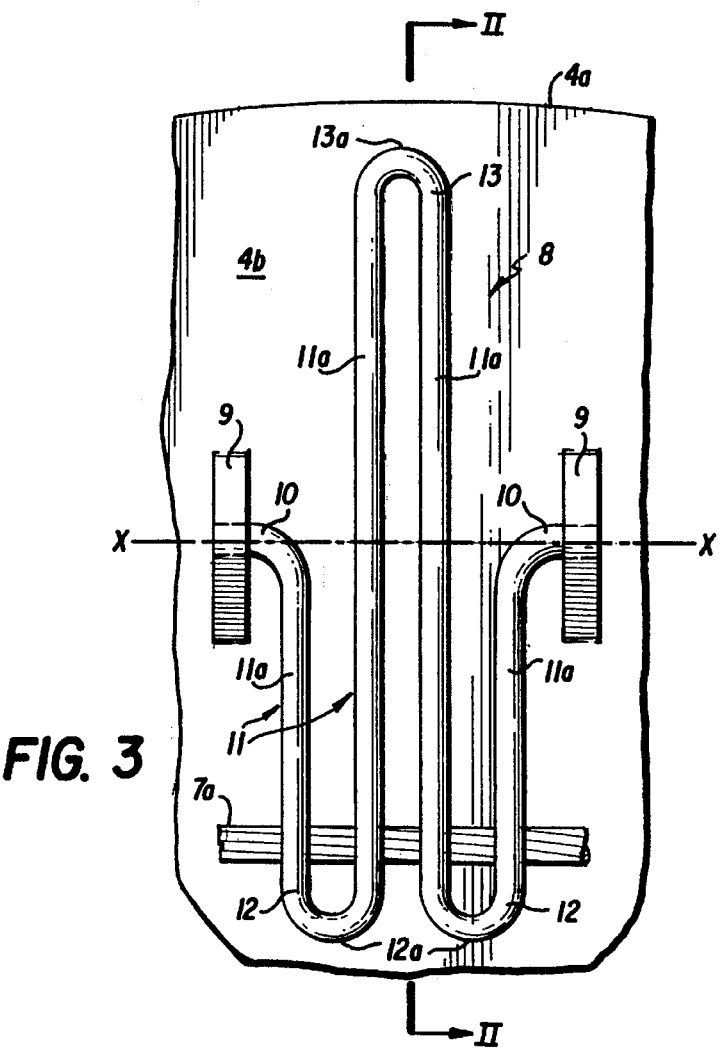
FIG. 3

ANCHORING DEVICE FOR SECURING AN END PIECE OF A CORD WOUND UP ONTO A STORAGE REEL

BACKGROUND OF THE INVENTION

The present invention relates to a device for securing an end portion of a cord wound up onto a storage reel, of the type comprising at least one engagement seat formed close to a circumferential edge of a disc-shaped flange of a storage reel, said engagement seat being arranged to slidably engage an end portion of a cord wound up onto a core carrying the disc-shaped flange at the end thereof for fixing the circumferential positioning of the end portion itself relative to the reel; at least one clip secured to an outer surface of the side flange and arranged to engage an end portion of said cord in order to fasten it to the outer surface of the flange.

The invention is in particular but not restrictively relevant to storage reels of the type used for storage and transportation of cords, generally made of a wire or similar threadlike manufactured articles of an overall diameter in the range of 0.5 to 1.5 mm, which cords are usually used in making reinforcing structures of elastomeric material articles, such as motor-vehicle tires, conveyor belts, pipes and the like.

It is known that cords used in the reinforcing structures of elastomeric material articles are produced by suitable cord-making machines which also carry out winding of the cord as it is produced onto an appropriate storage reel. This reel lends itself to be then used for the cord storage and during the transportation steps from the production station to the places where the cord is to be actually used and the reel will then become a proper supply reel for the machine designed to make reinforcing structures provided with said cord.

The reel essentially comprises a substantially cylindrical core onto which the cord being produced is wound forming coils disposed consecutively in side-by-side relation and overlapped in successive radial outward layers. In order to carry out an appropriate holding of the coil pack, associated with the opposite ends of the core are two disc-shaped flanges concentric with the core, the outer diameter of which substantially defines the maximum diameter that the coil pack formed with the cord wrapped onto the reel can accommodate.

Also associated with at least one of the disc-shaped flanges of the reel is a device adapted to conveniently retain the end portion of the curd in order to avoid undoing of the coil, following loosening of the cord-winding tension.

In this connection, reels presently in use essentially provide that close to the outer circumferential edge of at least one of the flanges a through hole ("engagement sent") be formed for the purpose of slidably engaging the end portion of the cord in order to fix the circumferential positioning thereof relative to the reel by means of said device. The cord end portion coming out of the through hole towards the outside of the disc-shaped flange is engaged to a clip essentially consisting of a thin plate element made of harmonic steel (that is manganese-silicon, spring steel) material fastened to the disc-shaped flange through clipping of the circumferential edge of said flange to one end of the thin plate element. The cord end piece is therefore engaged by forced fitting between the outer surface of the disc-shaped flange and the clip, so that it is fixedly retained by effect of friction generated by the spring reaction of the clip itself.

In order to facilitate interchangeability of the clip which is subjected to frequent breakages because it is submitted to important flexion stresses at the fitting of the clipped circumferential edge of the flange, devices have been conceived in which the clip is fastened by means of its terminal appendages snap-fitted into an undercut formed by the circumferential edge of the disc-shaped flange turned outwardly.

SUMMARY OF THE INVENTION

In accordance with the present invention, it has been found that if the clip is made of a springy material such as harmonic steel conveniently shaped, an important improvement is achieved in the distribution of the inner stresses in the clip and an easy and inexpensive interchangeability of the clip can be achieved in case of breakage thereof.

The present invention in one aspect relates to a storage reel in particular for cords and other thread-like strands, especially wires, comprising: a substantially cylindrical core, onto which at least one cord is wound so as to form a plurality of coils disposed in side by side relation and overlapped in successive radial outward layers maintained at a predetermined tension. There is also a pair of disc-shaped flanges for holding said coils, disposed at the opposite ends of the core and each having a generally circular circumferential edge concentric with the core itself; at least one opening ("engagement seat") is formed close to said edge of at least one of said disc-shaped flanges and arranged to slidably engage a portion of the cord wound up onto the core; that portion is usually near the outer end of cord and is thus arbitrarily called the "end position"; however, in instances where it might be desired to have a length of cord extending out from the reel, then that "end portion" may be spaced some considerable distance from the actual end of the cord. The engagement seat is for fixing the circumferential positioning of the end portion relative to said reel. There is at least one clip fastened to the outer surface of a disc-shaped flange and arranged to engage the end portion of the cord and secure it to the outer surface itself. The reel is characterized in that it further comprises:

a pair of supporting tabs projecting from the outer surface of at least one of said disc-shaped flanges, at mutually facing positions, for pivotally mounting a corresponding clip, that clip comprising:

an elongated spring element preferably of "W" shape having a pair of terminal appendages disposed at opposite positions and rotatably engaged in the supporting tabs, on a pivot axis X-13 X which is parallel to the outer surface of the flange, the inner surface of the tabs act as articulation seats each arranged in one of said supporting tabs, said spring element being bent to form consecutively opposite portions lying in a common plane disposed parallel and close to said outer surface, in order to form:

at least one retaining loop extending substantially perpendicular to the pivot axis of the clip and arranged to operatively engage the end portion of the cord and secure it to the outer surface of the side flange;

at least one counter-loop also projecting generally perpendicular to the pivot axis X-13 X on the opposite side from the retaining loop and arranged to interact in opposition relationship against the disc-shaped flange for elastically counteracting moving apart of the retaining loop from said outer surface, following the insertion of the cord end portion between the outer surface and retaining loop themselves.

In greater detail, the spring element preferably has an overall linear extension of between 80 mm and 120 mm, and a sectional profile which is preferably circular and of a diameter in the range of 1 to 1.5 mm; other sectional profiles such as square, rectangular or oval are contemplated.

Advantageously, said retaining loop has an apex spaced from said pivot axis by a distance of between 15 mm and 18 mm.

In turn, the counter-loop has an apex spaced from said pivot by apart a distance of between 5 mm and 10 mm.

The present invention in a second aspect relates to a device for clamping elongated or plate-like elements against a rest surface for said elements, characterized in that it comprises:

holding means formed in said rest surface, at mutually facing positions, for retaining an appropriate clip to said surface, and a clip to be engaged to said holding means, comprising:

an elongated spring element having a pair of terminal appendages disposed at opposite positions and rotatably engaged, on to a pivot axis parallel to said rest surface, by means of corresponding seats arranged in said holding means, said elongated element being bent along consecutively opposite portions lying in a common plane parallel to the plane of said rest surface in order to form:

at least one retaining loop extending substantially in a radial direction to the pivot axis and arranged to operatively engage said elongated or plate-like element and secure it to said rest surface;

at least one counter-loop projecting radially of the pivot axis on the opposite side from the retaining loop and arranged to interact in opposition relationship against said rest surface for elastically counteracting moving apart of the retaining loop from said surface following the insertion of the elongated or plate-like element between the rest surface and retaining loop.

The present invention in a third aspect relates to a clip for clamping elongated or plate-like elements against a rest surface for said elements, characterized in that it comprises:

an elongated spring element having a pair of terminal appendages disposed at opposite positions along a pivot axis parallel to said rest surface, for being rotatably engaged into corresponding holding means, formed in said rest surface at mutually facing positions, said elongated element being bent with consecutively opposite portions lying in a common plane parallel to the plane of said rest surface in order to form:

at least one retaining loop extending substantially in a radial direction to the pivot axis and arranged to operatively engage said elongated or plate-like element and secure it to said rest surface;

at least one counter-loop projecting radially of the pivot axis on the opposite side from the retaining loop and arranged to interact in opposition relationship against said rest surface for elastically counteracting moving apart of the retaining loop from said surface, following the insertion of said elongated or plate-like element between the rest surface and retaining loop.

BRIEF DESCRIPTION OF THE DRAWINGS

Further features and advantages will become more apparent from the detailed description of a preferred embodiment of a device for anchoring an end portion of a cord wound up onto a storage reel according to the present invention. This description is given hereinafter by way of non-limiting example, with reference to the accompanying drawings, in which:

FIG. 1 is a perspective view of a storage reel with which a device embodying the invention is associated;

FIG. 2 is a sectional view taken along line II—II of FIG. 3;

FIG. 3 is an enlarged front view of a clip associated with the device in question.

DETAILED DESCRIPTION OF PREFERRED EMBODIMENTS

Referring to the drawings, a device for anchoring one end portion of a cord wound up onto a storage reel according to the present invention has been generally identified by reference numeral 1.

In the following present description the term "cord" will be generally used both to identify a cord, that is a bundle of single elementary wires or strands differently twisted together, and a general elongated threadlike element, such as a wire or one of said strands for example.

As shown in FIG. 1, the device is associated with a storage reel generally identified by reference numeral 2 and comprising a core 3 of cylindrical tubular structure. Two generally circular disc-shaped flanges 4 concentric with the core are secured to axial opposite ends of said core. A cord 5 is wound up on said core 3 according to a predetermined tensional strength, which cord forms a plurality of coils 5a disposed in side by side relationship and overlapped in successive radial outward layers in the space between the disc-shaped flanges 4.

The foregoing being stated, the device provides that, in a manner known per se, at least one engagement seat 6 be formed at a circumferential edge 4a of at least one of the disc-shaped flanges 4. Said engagement seat 6 consists for example of a through hole, through which an end portion 7 of the cord 5 wound on the core 3 is inserted. The slidable engagement of the end portion 7 through the engagement seat 6 enables the circumferential positioning of the end portion relative to the reel 2 to be fixed.

The device also has at least one clip generally denoted by 8, fastened to the outer surface of a disc-shaped flange 4 for securing the end portion 7 of the cord 5 thereto.

In a novel manner, the clip 8 is mounted by means of a pair of supporting tabs 9 projecting, at positions disposed mutually in side by side relation, from the outer planar surface 4a of the disc-shaped flange 4. The supporting tabs 9 made, for example, by a punching operation carried out on the disc-shaped flange 4, define respective articulation seats 9a into which a pair of terminal appendages 10 operatively engage on a pivot axis X—X parallel to the outer surface 4b of the flange 4. Said terminal appendages 10 form the end portions, at opposite positions, of the elongated spring element 11 preferably made of harmonic steel material, bent according to consecutively opposite portions 11a lying in a common plane disposed parallel to and close to the outer surface 4b of the disc-shaped flange 4.

More particularly, the sequence of bending of the consecutively opposite portions 11a defines, in the forming of the elongated spring element 11, at least one retaining loop 12 extending substantially perpendicular to the pivot axis X—X, and at least one counter-loop 13 projecting perpendicularly from the pivot axis X—X on the opposite side from the retaining loop 12. In a preferred embodiment, the spring element is "W" shaped and at least one pair of retaining loops 12 disposed parallel to each other and in side by side relation is provided in conjunction with the elongated element 11, the counter-loop 13 being disposed at a substantially centered position relative to the retaining loops.

As clearly shown in FIG. 2, each of the retaining loops 12 lends itself to operatively engage the outer surface 7a of the end portion 7 of the cord 5 and hold it against the outer surface 4b of the disc-shaped flange 4; thus there are four separate friction engagements because of the two loops. In turn, the counter-loop 13 interacts in an abutment relation with the disc-shaped flange 4 in order to elastically counteract moving apart of the holding loops 12 from the outer surface 4b when the end portion 7 is fitted between the outer surface and holding loops.

In other words, the forced fitting of the end portion 7 between the outer surface 4b and holding loops 12 forces the latter to carry out an angular displacement about the pivot axis X—X of the terminal appendages 10. However, by effect of the action of the counter-loop 13 against the surface 4a, this angular displacement involves an elastic deformation along the elongated element 11, the reaction of said deformation generating friction between the end portion 7, the outer surface 4b and the two holding loops 12 which is sufficient to ensure the fixed clamping of the end portion 7.

Advantageously, the geometrical and dimensional parameters of the elastic elongated element 11 are selected such as to ensure an excellent fastening of the end portion 7 without imposing too strong efforts and squashing localized along the elongated element and on the end portion 7 of the cord 5, respectively. In the connection, the elongated spring element 11 (which may be "W" shaped) has an overall linear extension of between 80 mm and 120 mm, its sectional profile having a diameter in the range of 1 mm to 1.5 mm. Each of the holding loops 12 is also provided to have an apex 12a spaced apart a distance of between 15 mm and 18 mm from the pivot axis X—X.

The counter-loop 13, in turn, has an apex 13a spaced apart a distance of between 5 and 10 mm from the pivot axis X—X.

The present invention achieves important advantages.

In fact, the expedients adopted in manufacturing the clip associated with the device in question optimize the distribution of the inner efforts as compared to the clips of the prior art fastened by restrained fitting. As a result, the device of the invention has an improved reliability and enables the elimination of all problems of the known art resulting from frequent breaking of the clips which made practically impossible a subsequent reuse of the reels. In fact, on breaking of the clips, the result being that the cord was no longer clamped on the reel, the coils thereof were subjected to undoing and entangling and therefore it became necessary to wind up the cords again onto other reels before reusing them.

In addition, the device of the invention, even in case of breaking, can be restored to use almost immediately by virtue of the easy replacement of the elongate spring element 11.

On the contrary, in many of the known devices, due to the restrained fitting, the replacement of the clip when broken is rather complicated and can be done only at the place where the reel was produced. In fact for such a replacement it is necessary to act on the clipped edge of the disc-shaped flange for removal of the broken clip, and a new clipping operation is necessary for fastening of the new clip.

It should be also recognized that the restoration to use of the device of the invention can be readily carried out even in case of breaking of one or both of the support tabs 9. In fact, said tabs lend themselves to be easily replaced by metal bushes or other articulation elements to be fixed to the outer surface 4b of the disc-shaped flange 4 by a welding operation. Such an operation, that can be readily executed even at places other than the place of reel production, cannot be carried out when fastening of clips according to the known art is concerned, in that heat produced during welding would irreparably alter the elastic features of the harmonic steel of which said clips are made.

It is now apparent that the invention is not limited to clamping of cords to the corresponding storage reels but it can be advantageously used for clamping of any threadlike or plate-like element to a given rest surface, by fitting of a portion of said threadlike element or an edge of said plate-like element between the clip and the corresponding rest surface.

To the ends of the invention the presence of projecting tabs on said surface is not mandatory: in fact any types of holding means can be used, such as for example through holes or cavities formed in the thickness of the rest surface, provided that they are adapted to enable the engagement of a clip according to the invention in a rotatable manner about the pivot axis disposed parallel to said rest surface.

Obviously many modifications and variations may be made to the invention as conceived, all of them falling within the scope of the appended claims.

I claim:

1. A storage reel comprising:

a substantially cylindrical core, onto which at least one cord is wound with a predetermined tension;

a pair of disc-shaped end flanges for holding said wound cord which are disposed at axial opposite ends of the core, each flange having a circumferential edge concentric with said core;

at least one engagement hole formed close to said edge of at least one of said disc-shaped end flanges for passing through an end portion of the cord wound up onto the core, and for fixing a circumferential positioning of said end portion relative to said reel;

at least one clip fastened to an outer surface of said at least one of said pair of disc-shaped end flanges and arranged to engage an end portion of said cord and secure it to said outer surface of said at least one of said pair of disc-shaped end flanges;

a pair of supporting tabs projecting from said outer surface of said at least one of said disc-shaped end flanges at mutually facing positions, for pivotally mounting said clip, said clip comprising:

an elongated spring element having end portions which are disposed at opposite ends of said element and rotatably engaged, along a pivot axis parallel to an outer surface of the at least one of the pair of end flanges, to corresponding articulation seats each arranged in one of said supporting tabs, said spring element being bent to have consecutively opposite portions lying in a common plane disposed close to and parallel to said outer surface so as to form a leaf spring having at least two retaining loops extending substantially perpendicular to the pivot axis and arranged to operatively engage said end portion of the cord against the outer surface of said end flange; at least one counter-loop projecting perpendicular to said pivot axis on the opposite side from the retaining loops and resting against said at least one of said pair of disc-shaped end flanges, said at least one pair of end flanges being stiffer than the element for elastically counteracting moving apart of the retaining loops from said outer surface, following insertion of the cord end portion between the outer surface and retaining loops; said spring element having substantially a "W" shape, said retaining loops and said at least one counter-loop forming respective bent portions of said "W" shape, said at least one counter-loop being disposed at a substantially centered position in said "W" shape and relative to said retaining loops.

2. A reel according to claim 1, in which said elongated spring element is made of harmonic steel.

3. A reel according to claim 2, in which said elongated spring element has a sectional profile of a diameter in the range of 1 to 1.5 mm.

4. A reel according to claim 1, in which said spring element has, prior to bending into said "W" shape, an overall linear extension of between 80 mm and 120 mm.

5. A reel according to claim 1, in which said retaining loops each has an apex, said apexes being spaced apart a distance of between 15 mm and 18 mm from said pivot axis.

6. A reel according to claim 5, in which said counter-loop has an apex spaced apart a distance of between 5 mm and 10 mm from said pivot axis.

7. A clip for clamping an elongated element against a rest surface, comprising;

an elongated spring element having end portions which are disposed at opposite ends of said spring element along a pivot axis parallel to said rest surface, for being rotatably engaged into corresponding holding means which are formed on said rest surface at mutually facing positions, said spring element being bent in consecutively opposite portions lying in a common plane disposed close by and parallel to said rest surface in order to form a leaf spring having at least two retaining loops extending substantially perpendicular to the pivot axis and arranged to operatively engage said elongated element against said rest surface;

at least one counter-loop projecting perpendicular to the pivot axis on the opposite side from the retaining loops and resting against said surface for elastically counteracting moving apart of the retaining loops from said rest surface, following the insertion of said elongated element between the rest surface and retaining loops; said spring element having a substantially "W" shape, said retaining loops and said at least one counter-loop forming respective bent portions of said "W" shape, said at least one counter-loop being disposed at a substantially centered position in said "W" shape and relative to said retaining loops.

8. A device for clamping an elongated element against a rest surface, comprising:

a clip; and holding means on said rest surface, at mutually facing positions, for engaging said clip on said rest surface;

said clip comprising:

an elongated spring element having end portions which are disposed at opposite ends of said spring element and rotatably engaged, on a pivot axis parallel to said rest surface, to corresponding articulation seats each arranged in one of said holding means, said spring element being bent along consecutively opposite portions lying in a common plane disposed close to and parallel to said rest surface so as to form a leaf spring having at least two retaining loops extending substantially perpendicular to the pivot axis and arranged to operatively engage said elongated element against said rest surface;

at least one counter-loop projecting substantially perpendicular to the pivot axis on an opposite side from the retaining loops and resting against said rest surface for elastically counteracting moving apart of the retaining loops from said rest surface, following insertion of the elongated element between the rest surface and retaining loops;

said spring element having substantially a "W" shape, said retaining loops and said at least one counter-loop forming respective bent portions of said "W" shape, said at least one counter-loop being disposed at a substantially centered position in said "W" shape and relative to said retaining loops.

* * * * *